United States Patent [19]
Larkins et al.

[11] Patent Number: 6,151,505
[45] Date of Patent: *Nov. 21, 2000

[54] SYSTEM AND METHOD FOR REPORTING THE LOCATION OF A MOBILE TELECOMMUNICATIONS UNIT TO AN AUTHORIZED TERMINATOR TELECOMMUNICATIONS UNIT

[75] Inventors: John Pruett Larkins; Gary Boyd Stephens, both of Allen, Tex.

[73] Assignee: Northern Telecom Limited, Montreal, Canada

[*] Notice: This patent issued on a continued prosecution application filed under 37 CFR 1.53(d), and is subject to the twenty year patent term provisions of 35 U.S.C. 154(a)(2).

[21] Appl. No.: 08/887,725

[22] Filed: Jul. 3, 1997

[51] Int. Cl.[7] .................................................. H04B 1/00
[52] U.S. Cl. ............................................. 455/456; 455/39
[58] Field of Search ................................... 455/456, 457; 701/23, 200, 2.1, 207, 211, 213, 300; 340/988

[56] References Cited

U.S. PATENT DOCUMENTS

| | | | |
|---|---|---|---|
| 4,954,958 | 9/1990 | Savage et al. | 701/202 |
| 5,177,685 | 1/1993 | Davis et al. | 701/209 |
| 5,293,642 | 3/1994 | Lo . | |
| 5,327,144 | 7/1994 | Stilp et al. . | |
| 5,363,425 | 11/1994 | Mufti et al. . | |
| 5,539,810 | 7/1996 | Kennedy, III et al. . | |
| 5,543,789 | 8/1996 | Behr et al. | 701/207 |
| 5,544,225 | 8/1996 | Kennedy, III et al. . | |
| 5,550,907 | 8/1996 | Carlsen . | |
| 5,594,425 | 1/1997 | Ladner et al. . | |
| 5,625,668 | 4/1997 | Loomis et al. . | |
| 5,629,693 | 5/1997 | Janky . | |
| 5,677,837 | 10/1997 | Reynolds | 455/456 |
| 5,712,899 | 1/1998 | Pace, II . | |
| 5,732,354 | 3/1998 | MacDonald . | |
| 5,771,455 | 6/1998 | Kennedy, III et al. . | |
| 5,960,341 | 9/1999 | LeBlanc et al. | 455/426 |
| 5,987,381 | 11/1999 | Oshizawa | 701/209 |

FOREIGN PATENT DOCUMENTS

| | | | |
|---|---|---|---|
| 0 810 571 | 12/1997 | European Pat. Off. | G08G 1/969 |
| 6-261149 | 9/1994 | Japan | H04M 11/00 |
| 8-065413 | 3/1996 | Japan | H04M 11/02 |
| 9-008935 | 1/1997 | Japan | H04H 11/00 |
| 9-319991 | 12/1997 | Japan . | |

*Primary Examiner*—Nguyen Vo
*Assistant Examiner*—Makoto Aoki
*Attorney, Agent, or Firm*—Haynes and Boone, LLP

[57] ABSTRACT

A system and method of providing a terminator telecommunications unit with the geographic location of a mobile telecommunications unit, where the terminator unit may then provide directions to the mobile unit in voice format or non-voice data format so the mobile unit can use the directions to arrive at the location of the terminator unit.

25 Claims, 1 Drawing Sheet

SYSTEM AND METHOD FOR REPORTING THE LOCATION OF A MOBILE TELECOMMUNICATIONS UNIT TO AN AUTHORIZED TERMINATOR TELECOMMUNICATIONS UNIT

SPECIFICATION

BACKGROUND OF THE INVENTION

1. Field of the Invention

This invention relates to a system and method of providing a terminator telecommunications unit with the geographic location of a mobile telecommunications unit. The terminator unit then provides geographic directional assistance to the mobile unit.

2. Discussion of Related Technology

It often occurs that when a mobile telecommunications unit places a call to a terminator telecommunications unit, such as land-wired telephone, the user of the mobile unit will need and desire directions to the geographic location of the terminator unit. For example, if someone is driving to a restaurant and knows the phone number of the restaurant, but not its location, the mobile unit user could call the terminator unit and have the geographic location of the mobile unit provided, in near real-time, to the terminator unit. In this way, the user of the terminator unit would know the location of the mobile unit and could provide directions to guide the user of the mobile unit to the restaurant.

The terminator unit could also provide the assistance to the mobile unit by using computer generated voice prompts or by providing geographical data to the mobile unit in non-voice format.

SUMMARY OF THE INVENTION

The present invention describes a system and method of providing a terminator telecommunications unit with the geographic location of a mobile telecommunications unit. The terminator unit is thereby given the opportunity and ability to provide assistance to the mobile unit in the form of directions, or other location based servicing information, to the terminator unit. The terminator unit could otherwise merely monitor the location of the mobile unit in near real-time for tracking purposes.

Both voice and data information can be provided between the mobile unit and the terminator unit. The geographic location of the mobile unit may be provided to the terminator unit by way of data, or by way of voice information. Examples of such data or information are SMS (short message service) or CDPD (cellular digital packet data). Likewise, once the geographic location of the mobile unit is ascertained by the terminator unit, the terminator unit may provide geographic directional information to the mobile unit regarding directions to the location of the terminator unit. In such a situation, the mobile unit is typically a wireless mobile telephone, but may be a computer or any other device capable of communicating via wireless protocol. The directional information from the terminator unit to the mobile unit may be in the form of voice data, or other non-voice data format.

The information regarding the geographic location of the mobile unit may be continuously updated in near real-time, such that the terminator unit will be provided, with the most recent location of the mobile unit so that directions from the terminator unit may be very precise.

The geographic location of the mobile unit can be determined by various known methods, such as, a GPS satellite, a device that performs triangulation calculations, or distance delay calculations, or other similar method.

DETAILED DESCRIPTION OF THE PREFERRED EMBODIMENTS

Figure 1:
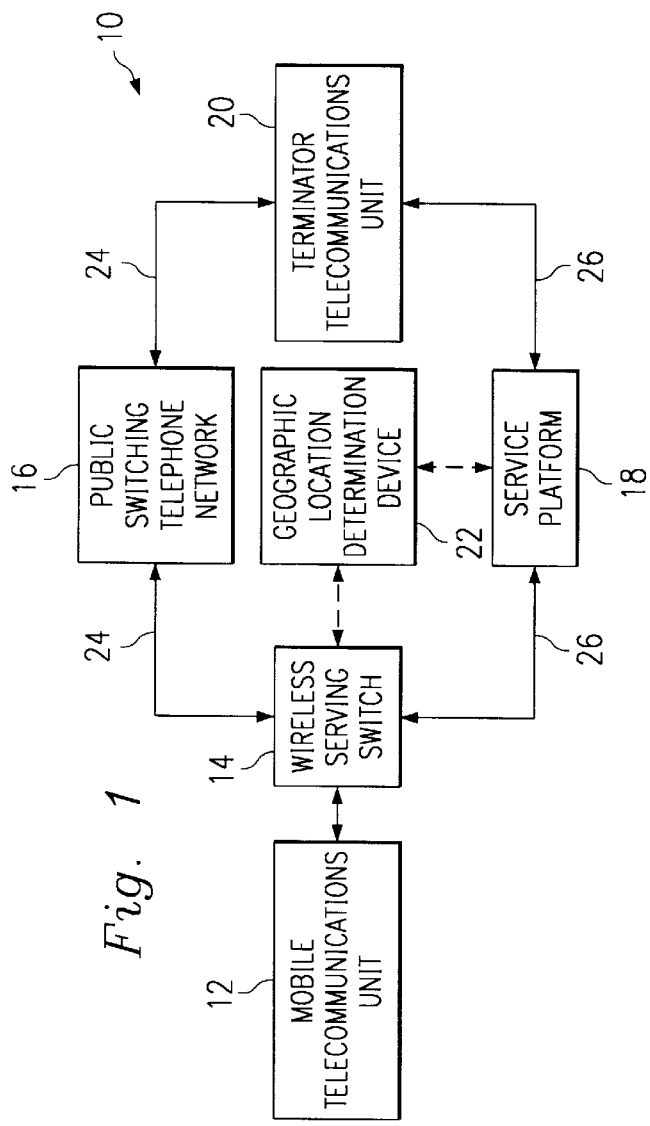
FIG. 1 and FIG. 2 are schematic block diagrams of different embodiments of the system and method of the present invention.

As shown in FIG. 1, a geographic location assistance provider system 10 is shown which provides a terminator telecommunications unit 20 with the most recent geographic location of a wireless mobile telecommunications unit 12. Mobile unit 12 communicates to terminator unit 20 via a wireless serving switch 14 and via either a public switching telephone network (PSTN) 16 or a service platform 18. As shown in FIG. 1, mobile telecommunications unit 12 initiates a telecommunications message, i.e. telephone call, to the terminator unit 20. Terminator unit 20 may be a land-wired telephone or computer, or may be a wireless telephone, a pager device or a wireless computer. The voice message communication path for the telephone call between mobile unit 12 and terminator unit 20 includes wireless serving switch 14, PSTN 16 and terminator unit 20.

Non-voice formatted data representing the geographic location of mobile unit 12 is provided to terminator unit 20 via data path 26, through service platform 18, by geographic location determination device 22. Device 22 provides the data either directly to service platform 18 or indirectly to service platform 18 through wireless serving switch 14 prior to the data being provided to terminator unit 20. The geographic data representing the geographic location of mobile unit 12 is continuously updated in near real-time. Various devices and methods may be used by geographic location determination device 22 to determine the geographic location of mobile unit 12. For example, a space-based satellite platform, such as a GPS system, may be used to provide the geographic location data of mobile unit 12. Additionally, a location determining device which performs triangulation calculations or distance delay calculations using known methods may be employed. As an alternative method, mobile unit 12 itself may provide the data representing its own geographic location.

The data path 26 from wireless serving switch 14 through service platform 18 to terminator unit 20 may be via the Internet or any other standard computer protocol communications path. As explained, the data representing the geographic location of mobile unit 12 is not sent over the voice path 24, which exists from wireless serving switch 14 through PSTN 16 to terminator unit 20.

Communication over the data path 26 between wireless serving switch 14 and service platform 18 is typically of a standard communications protocol such as CTIA IS-41 or ITU GSM MAP. The data path protocol between wireless serving switch 14 and terminator unit 20 may be typical voice data protocol used by most telephone systems worldwide such as GSM or AMPS.

By initiating the telecommunications message, mobile unit 12 may be calling terminator unit 20 to request directions to the location of the terminator unit 20. Mobile unit 12 is preferably a wireless telephone or computer, or any other device which is capable of maintaining a telecommunications path to a wireless serving switch 14. If the mobile unit 12 is in a moving vehicle in an unfamiliar geographic area, the terminator unit 20 may be needed to assist the user of mobile unit 12 to provide directions.

Once terminator unit 20 has received the geographic location of mobile unit 12, the terminator unit may automatically provide the mobile unit 12 user with voice prompt instructions regarding how to get to the terminator unit's location via data path 26, or the human terminator unit 20 user may provide verbal directions to mobile unit 12 via voice path 24. In either case, the instructions may be in near real-time since the geographic location is being continuously updated by geographic location determination device 22. In this example, if the data representing the directional information for mobile unit 12 is provided to mobile unit 12 from terminator unit 20 in a non-voice data format over data path 26, a protocol such as electronic messaging short message service (SMS) format or cellular digital packet data (CDPD) format is utilized. The data would flow from terminator unit 20 to mobile unit 12 via service platform 18 and wireless serving switch 14. Mobile unit 12 would then receive the directional data, which would be displayed by mobile unit 12 for its user.

Preferably, the mobile unit 12 user must provide an access code or other fib form of proper authorization to activate the location assistance provider system 10. Additionally, the mobile unit 12 user may provide the phone number or other identification of the mobile unit 12 to be monitored regarding its geographic location.

Figure 2:
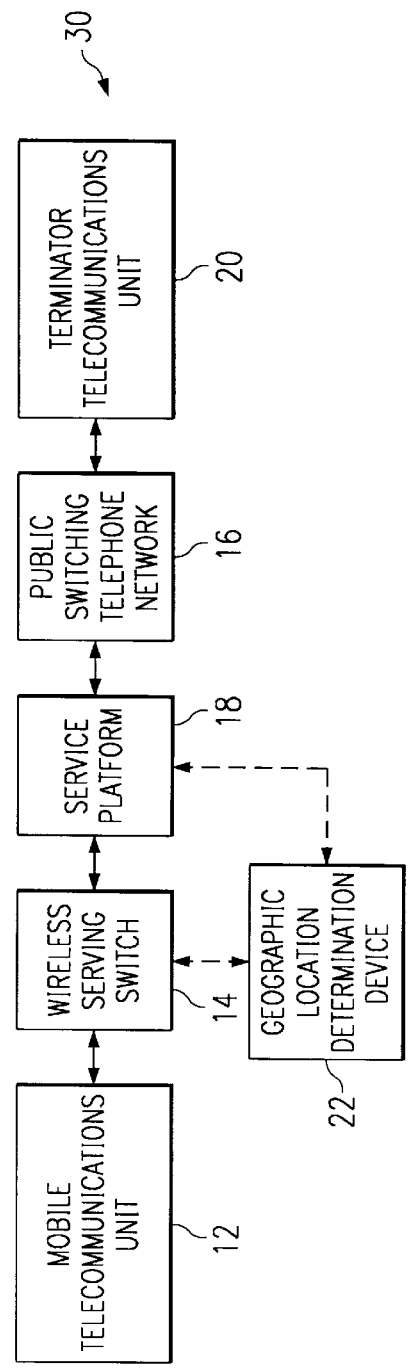

Now referring to FIG. 2, another embodiment of the present invention is illustrated. In this embodiment, a geographic location assistance system 30 includes the blocks shown. System 30 of FIG. 2 differs from the system 10 of FIG. 1 in that the directional information based on the geographic location of mobile unit 12 may be provided to mobile unit 12 by terminator unit 20 in the form of audio information via the communications path which includes wireless serving switch 14, service platform 18 and PSTN 16. Service platform 18 inserts the directional voice information in the communications path between mobile unit 12 and terminator unit 20, thereby allowing the directions to the terminator unit 20 to be in a voice format. Also, the geographic location of mobile unit 12 provided to terminator unit 20 is in voice format.

As in the system 10 of FIG. 1, mobile unit 12 initiates the telephone call which initiates the geographic location assistance system 30 shown in FIG. 2. Also as with system 10 of FIG. 1, continuous updates of the location of mobile unit 12 are accomplished in near real-time in the same manner as that described for the system 10 of FIG. 1.

The foregoing disclosure and description of the invention are illustrative and explanatory of the preferred embodiments. Changes in the size, shape, materials, elements and individual components used, the connections made, or other construction, may be made without departing from the spirit and scope of the invention herein claimed.

What is claimed is:

1. A method of providing a telecommunications unit with the geographic location of a mobile telecommunications unit, comprising the steps of:
    (a) providing a wireless mobile telecommunications unit;
    (b) providing a terminator telecommunications unit located at a destination of said mobile unit;
    (c) initiating a telephone call by said mobile unit to said terminator unit through a wireless serving switch;
    (d) providing a voice communications path between said terminator unit and said wireless serving switch;
    (e) providing a data communications path different from said voice communications path between said terminator unit and said wireless serving switch; and
    (f) providing a geographic location device connected to said wireless serving switch;
    (g) providing a service platform in communication with said geographic location determination device, for receiving the geographic data and providing the geographic data to said terminator unit.

2. The method of claim 1, wherein prior to said step of providing voice communications is accomplished, said mobile unit provides an authentication code.

3. The method of claim 1, further comprising the step of providing said mobile unit with directional information from said terminator unit.

4. The method of claim 1, wherein prior to said step of providing voice communications is accomplished, said mobile unit provides an identification of said mobile unit.

5. The method of claim 1, wherein said terminator unit comprises a computer.

6. The method of claim 1, wherein said terminator unit comprises a telephone device.

7. The method of claim 1, wherein said step of providing geographic data is accomplished such that said data is continuously updated in near real-time.

8. The method of claim 1, wherein said mobile unit comprises a wireless telecommunications device.

9. The method of claim 8, wherein said wireless device comprises a telephone device.

10. The method of claim 8, wherein said wireless device comprises a computer.

11. The method of claim 3, wherein said directional information provided to said mobile unit is in a voice format.

12. The method of claim 1, wherein said geographic location data is provided to said terminator unit in voice format.

13. A system for providing a telecommunications unit with a geographic location of a mobile telecommunications unit, comprising:
    (a) a mobile telecommunications unit;
    (b) a terminator telecommunications unit located at a destination of said mobile unit;
    (c) a wireless switching system for establishing a wireless connection to the mobile telecommunications unit;
    (d) a geographic location determination device in communication with the mobile unit through said wireless switching system for receiving information from said mobile unit and converting the information into geographic data representing the geographic location of said mobile unit; and
    (e) a service platform in communication with said said geographic location determination device, for receiving the geographic data and providing the geographic data to said terminator unit;
    wherein a voice communications path is provided between said mobile unit and said terminator unit; and
    wherein a data communications different from said voice communications path is provided between said terminator unit and said mobile unit wireless switching system, said data communications path for providing said geographic data to said terminator unit.

14. The system of claim 13, wherein said geographic data is provided to said terminator unit in voice format.

15. The system of claim 13, wherein said mobile unit originates a telecommunications message to said terminator unit and provides an authentication code.

16. The system of claim 13, wherein said terminator unit comprises a computer.

17. The system of claim 13, wherein said mobile unit comprises a wireless telecommunications device.

18. The system of claim 17, wherein said wireless device comprises a telephone device.

19. The system of claim 17, wherein said wireless device comprises a computer.

20. The system of claim 13, wherein said terminator unit comprises a telephone device.

21. The system of claim 13, wherein said geographic data provided is continuously updated in near real-time.

22. The method of claim 1 wherein said voice communications path utilizes the wireless serving switch and a public switched telephone network.

23. The method of claim 1 wherein said data communication path utilizes the wireless serving switch and said service platform.

24. The system of claim 13 wherein said voice communications path utilizes the wireless serving switch and a public switched telephone network.

25. The system of claim 13 wherein said data communications path utilizes the wireless serving switch and said service platform.

\* \* \* \* \*